United States Patent
Suga

(10) Patent No.: US 8,846,185 B2
(45) Date of Patent: Sep. 30, 2014

(54) DECORATED SHEET FOR INSERT MOLDING

(75) Inventor: Kazuhiro Suga, Saitama (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 973 days.

(21) Appl. No.: 12/159,423

(22) PCT Filed: Dec. 26, 2006

(86) PCT No.: PCT/JP2006/325853
§ 371 (c)(1),
(2), (4) Date: Jun. 27, 2008

(87) PCT Pub. No.: WO2007/077808
PCT Pub. Date: Jul. 12, 2007

(65) Prior Publication Data
US 2010/0221509 A1   Sep. 2, 2010

(30) Foreign Application Priority Data

Dec. 28, 2005  (JP) .................................. 2005-379228
Sep. 12, 2006  (JP) .................................. 2006-247009

(51) Int. Cl.
| | | |
|---|---|---|
| B32B 3/10 | (2006.01) | |
| B44C 1/17 | (2006.01) | |
| B29C 45/14 | (2006.01) | |
| B32B 25/04 | (2006.01) | |
| B29K 55/02 | (2006.01) | |

(52) U.S. Cl.
CPC ............... *B32B 25/04* (2013.01); *B44C 1/1729* (2013.01); *B29C 45/14811* (2013.01); *B29K 2995/002* (2013.01); *B29K 2055/02* (2013.01); *B29K 2995/0087* (2013.01)
USPC ......... 428/201; 428/195.1; 428/203; 428/332; 428/521; 428/522; 428/523; 264/271.1; 264/275

(58) Field of Classification Search
USPC .............. 428/201, 195.1, 203, 332, 521, 523, 428/522; 264/271.1, 275
See application file for complete search history.

(56) References Cited

FOREIGN PATENT DOCUMENTS

| | | |
|---|---|---|
| JP | 06-016832 | 1/1994 |
| JP | 2916130 | 4/1999 |
| JP | 2001-328212 | 11/2001 |
| JP | 2001-334609 | 12/2001 |
| JP | 2003-170546 | 6/2003 |

OTHER PUBLICATIONS

Machine Translation of JP2003-170546 Masubuchi.*
Machine translation of JP 2001-334609 accquried on Oct. 12, 2011.*

* cited by examiner

*Primary Examiner* — Gerard Higgins
*Assistant Examiner* — Christopher Polley
(74) *Attorney, Agent, or Firm* — Antonelli, Terry, Stout & Kraus, LLP.

(57) ABSTRACT

Provided is a decorated sheet for insert molding in which at least a base sheet, a print layer and a surface resin layer are laminated, wherein the above base sheet comprises an ABS resin having a butadiene content of 10 to 33% by weight based on the total component, and the surface resin layer has a thickness of 50 to 150 μm. Capable of being provided is a novel decorated sheet which does not generate harmful gases such as a chlorine gas and the like in burning and therefore does not bring about problems such as environmental pollution and the like and which is excellent in a so-called vacuum molding property and can suitably be used for various interior decorations of automobiles and the like.

15 Claims, 1 Drawing Sheet

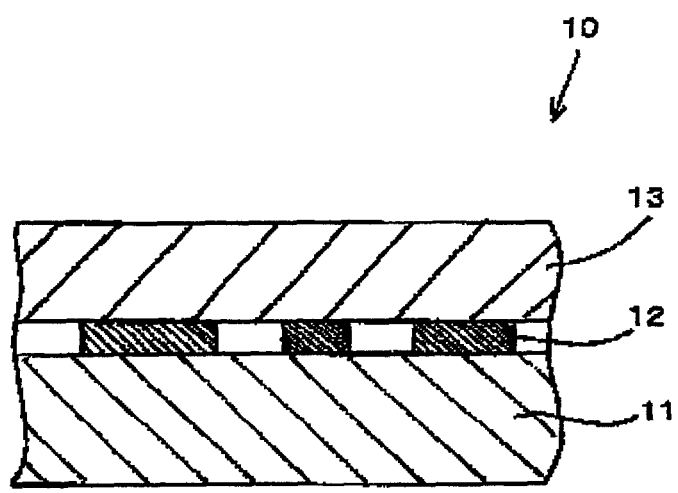

DECORATED SHEET FOR INSERT MOLDING

BACKGROUND OF THE INVENTION

The present invention relates to a decorated sheet for insert molding, more specifically to a decorated sheet for insert molding capable of being suitably used in the fields such as interior decorations of buildings and automobiles in which a high design property is required and which are used for insert molding.

RELATED ART

Decorated sheets in which a base sheet, various print layers and a surface resin layer are laminated in order have so far been used for decorations of wall papers, furniture, building materials, interior parts of automobiles and the like.

In the fields of the above decorated sheets, vinyl chloride sheets, vinyl chloride-vinyl acetate copolymer sheets and the like have been used as a base sheet. These sheets have the advantages that they are excellent in a processing aptitude, a printing aptitude, an embossing aptitude and the like and can readily be controlled in a hardness by adding a plasticizer and that they are inexpensive, and therefore they have so far widely been used.

However, when vinyl chloride sheets and vinyl chloride-vinyl acetate copolymer sheets are used as a base sheet constituting a decorated sheet, a vinyl chloride monomer and hazardous gases such as chlorine gas and the like are likely to be generated in burning, and it is concerned about that an incinerator used in burning is damaged and that the environment is contaminated, so that problems are involved therein.

In order to solve the above problems, a material of a base sheet is changed to a material of a non-vinyl chloride base at present (for example, patent documents 1 and 2).

A decorated sheet in which a polyolefin base resin is used for a base sheet is disclosed in the patent document 1, and a decorated sheet in which an acryl resin is used for a base sheet is disclosed in the patent document 2.

Patent document 1: Japanese Patent Application Laid-Open No. 16832/1994

Patent document 2: Japanese Patent No. 2916130

DISCLOSURE OF THE INVENTION

However, the performances of the decorated sheets disclosed in the above patent documents are not necessarily satisfactory in some cases.

For example, when producing various parts for interior decoration of automobiles and the like, metallic and woodgrain decorated sheets are used in many cases at present, and these various parts are produced in almost all cases by a so-called insert molding method in which a decorated sheet is set in advance in a die and in which a molten resin is then injected into the die to thereby mold a part integrally with the decorated sheet. When used for the above application, problems have been caused in many cases on an adhesive property with an adherend, a folding processability and the like in the decorated sheets prepared by using the base sheets disclosed in the patent documents described above. Further, in the above insert molding method, a resin which is molten at 220 to 240° C. in a die is pressed from a base sheet side of a decorated sheet, and in such case, heat transferred from the resin is filled up in the decorated sheet to allow an ink in a print layer to flow out, so that the design property is damaged in a certain case.

The present invention has been made in light of the above circumstances, and an object thereof is to provide a novel decorated sheet which does not generate harmful gases such as a chlorine gas in burning and therefore does not bring about problems such as environmental pollution and which is excellent in a so-called insert molding property and therefore can suitably be used for various interior decorations of automobiles and the like.

The present invention for achieving the object described above is characterized by a decorated sheet for insert molding in which at least a base sheet, a print layer and a surface resin layer are laminated, wherein the above base sheet comprises an ABS resin having a butadiene content of 10 to 33% by weight based on the total component, and the surface resin layer has a thickness of 50 to 150 µm.

In the invention described above, the base sheet may have a Vicat softening temperature of 85 to 100° C. and a bend elastic modulus of 1100 to 2000 MPa.

Further, in the invention described above, at least a thermoplastic resin may be contained in the print layer described above.

According to the invention described above, in the decorated sheet in which at least the base sheet, the print layer and the surface resin layer are laminated, the base sheet described above is composed of the ABS resin having a butadiene content of 10 to 33% by weight based on the total component, and therefore the decorated sheet can be provided with various characteristics with which the ABS resin is endowed, to be specific, a rigidity, a hardness, a processability, an impact resistance, a bend fatigue property and the like.

Further, according to the invention described above, the ABS resin is not simply used, and a content of butadiene constituting the ABS resin is limited to a prescribed value. In this respect, when using a decorated sheet in an insert molding method, the above decorated sheet is, as described above, brought into contact with a molten resin of 200° C. or higher, and according to the decorated sheet of the present application, a distinct rubber odor originating in a butadiene component contained in the ABS resin for the base sheet is not produced to make it possible to enhance the moldability. Accordingly, the decorated sheet of the present application can suitably be used for decoration of interior panels and the like of cars.

Further, in the decorated sheet of the present application, a thickness of the surface resin layer is restricted to 50 to 150 µm, and therefore even when brought into contact with a molten resin of high temperature, heat transferred from the resin can be released, as described above, to the die without allowing it to stay in the decorated sheet, so that an ink constituting the print layer can be prevented from flowing out due to heat to reduce the design property.

Further, a Vicat softening temperature of the base sheet comprising the ABS resin is set to 85 to 100° C., and a bend elastic modulus thereof is set to 1100 to 2000 MPa, whereby the moldability in carrying out insert molding can be improved more.

In the decorated sheet of the present application, the print layer described above can contain at least a thermoplastic resin. The decorated sheet of the present application can prevent, as described above, the ink contained in the print layer from flowing out due to heat, and therefore thermoplastic resins which are easily affected by heat can be used as a binder component and the like to make it possible to enhance a freedom degree in selecting the ink. Further, adding the thermoplastic resin to the print layer makes it possible to enhance a flexibility of the above print layer, which results in making it possible to enhance a following property of the decorated sheet to the die in insert molding and obtain an insert molded article having a higher design.

BRIEF DESCRIPTION OF THE DRAWINGS

FIG. 1 is an outline cross-sectional drawing for explaining the constitution of the decorated sheet of the present invention.

EXPLANATIONS OF THE CODES

| | |
|---|---|
| 10 | Decorated sheet |
| 11 | Base sheet |
| 12 | Print layer |
| 13 | Surface resin layer |

BEST MODE FOR CARRYING OUT THE INVENTION

The decorated sheet of the present invention shall specifically be explained below with reference to the drawing.

FIG. 1 is an outline cross-sectional drawing for explaining the constitution of the decorated sheet of the present invention.

As shown in FIG. 1, a decorated sheet 10 in the present invention is constituted by laminating a base sheet 11, a print layer 12 and a surface resin layer 13.

(1) Base Sheet

The decorated sheet 10 of the present invention is characterized by that the base sheet 11 comprises an ABS resin having a butadiene content of 10 to 33% by weight based on the total component. Using the above ABS resin as the base sheet not only makes it possible to improve the decorated sheet and various characteristics, particularly an insert moldability but also prevents a rubber odor from being generated even when used for insert molding. Accordingly, it can suitably be used in producing parts for interior decoration of cars and the like.

In this connection, the ABS resin constituting the decorated sheet 10 is a copolymer of acrylonitrile, butadiene and styrene.

In the present invention, the butadiene content is limited to the range described above because of the reasons that a butadiene content of less than 10% by weight raises a Vicat softening temperature of the decorated sheet to elevate a bend elastic modulus thereof and that as a result thereof, air discharge implemented in order to carry out insert molding is deteriorated in vacuum molding to make a so-called freeze line liable to be brought about. Further, the high bend elastic modulus (rigidity) is likely to cause the problem that inferior laminate due to air filling and slack is liable to be brought about when carrying out dry laminate. On the other hand, if the butadiene content exceeds 33% by weight, a rubber odor is likely to be produced when the decorated sheet is used for an insert molding method, and the problem that the linear expansion coefficient grows larger to make distortion liable to be caused by shrinkage in molding is likely to be brought about. The butadiene content has to be 10 to 33% by weight, more preferably 24 to 33% by weight and particularly preferably 27 to 30% by weight based on the total component.

In the present invention, the contents of the other components (acrylonitrile and styrene) shall not specifically be restricted as long as the butadiene content is 10 to 33% by weight based on the total component, and they can suitably be set according to the expected characteristics. For example, a content of acrylonitrile is preferably 19 to 48% by weight based on the total component, and on the other hand, a content of styrene is preferably 38 to 48% by weight based on the total component. It is a matter of course that the contents of these components have to be set so that they account for 100% by weight in total.

The base sheet 11 in the decorated sheet 10 of the present invention has preferably a Vicat softening temperature of 85 to 100° C. and a bend elastic modulus of 1100 to 2000 MPa. Setting the Vicat softening temperature and the bend elastic modulus to the above values makes it possible to enhance the characteristics of the decorated sheet, particularly an insert molding property.

In this connection, the Vicat softening temperature is defined by a temperature of a medium (a heating bath or a heating phase) observed when an acicular indentator set vertically to a test piece penetrates into the test piece by 1 mm, wherein the test piece is disposed in the heating bath or the heating phase, and the medium is heated at a constant rate while applying a prescribed load to the test piece through the acicular indentator. In the present invention, the Vicat softening temperature is a value determined by a measuring method specified in JIS K 7206.

If a value of the Vicat softening temperature is lower than 85° C., a so-called orange peel is produced in a continuous heat resistant test, and the heat resistant creep is reduced in a certain case. On the other hand, if a value of the Vicat softening temperature is higher than 100° C., air filling is brought about in laminating, and foaming is caused in vacuum molding in a certain case.

In the present invention, the bend elastic modulus is a value determined by a measuring method prescribed in ISO 178.

If a value of the bend elastic modulus is smaller than 1100 MPa, the rigidity is reduced. On the other hand, if the value of the bend elastic modulus is larger than 2000 MPa, it is difficult in a certain case to remove slack in continuous dry laminate. The value of the bend elastic modulus falls more preferably in a range of 1100 to 1300 MPa in terms of the rigidity and removal of slack.

A thickness of the base sheet 11 in the decorated sheet 10 of the present invention shall not specifically be restricted in the present application, and it can suitably be selected according to the uses. It may be, for example, about 300 to 700 μm, and it is preferably 400 to 600 μm considering the insert moldability.

Further, if the whole part of the decorated sheet 10 is increased in a thickness, not only it is increased as well in a cost, but also the decorated sheet is pulled by flow of the injected molten resin in insert molding, so that wrinkles are produced at the both ends in a certain case. Accordingly, a thickness of the whole part of the decorated sheet 10 is preferably about 2.5 to 3.0 mm.

(2) Print Layer

Next, the print layer 12 in the decorated sheet 10 of the present invention shall be explained.

The print layer 12 is a layer formed from an ink by a publicly known printing method such as, for example, gravure printing, offset printing, silk screen printing, transfer printing from a transfer sheet, sublimation transfer printing, ink jet printing and the like. In addition thereto, in the case of a whole solid pattern, it may be formed from a coating material by a publicly known coating method such as gravure coating, roll coating and the like.

The pattern of the print layer 12 shall not specifically be restricted and can suitably be selected according to the uses, and it includes, for example, woodgrain patterns, marble grain patterns, texture grain patterns, leather tying patterns, geometric figures, characters, symbols, whole solid patterns and the like. The print layer 12 is used as well in combination of a pattern layer expressing patterns such as woodgrain patterns and the like with a whole solid layer. The whole solid layer is used usually in the form of a masking layer, a color layer, a color masking layer and the like.

The print layer 12 is formed usually on the base sheet 11 by printing, and therefore it is formed, as shown in FIG. 1, on the surface side of the base sheet 11, but it shall not be restricted to the above embodiment and can be formed on the back surface and the both front and back surfaces of the base sheet 11 or the back surface, the front surface and the both front and back surfaces of a surface resin layer described later.

Various kinds of polyester resins, urethane resins, acryl resins, vinyl acetate resins, vinyl chloride-vinyl acetate copolymers, cellulose base reins and chlorinated polyolefin resins such as chlorinated polyethylene, chlorinated polypropylene and the like can be used alone or in a mixture of two or more kinds thereof as a binder for an ink or a coating material used for forming the print layer 12 constituting the decorated sheet 10 of the present invention, and it shall not specifically be restricted. In the present invention, however, thermoplastic resins out of them are preferably added, and among them, polyester-urethane resins are preferably used. This is because of the reasons that a balance between a thermoplastic action of the polyester component and a thermosetting action of the urethane component is most suited and that the heat resistance and the moldability are good as well.

In this regard, chlorinated polyolefin resins are resins containing chlorine and therefore are not preferably used.

A colorant used for the ink or the coating material described above includes inorganic pigments such as titan white, zinc oxide, iron oxide red, vermilion, ultramarine blue, cobalt blue, titan yellow, chrome yellow, carbon black and the like, organic pigments (including dyes) such as isoindolinone yellow, Hansa yellow A, quinacridone red, permanent red 4R, phthalocyanine blue, indathrene blue RS, aniline black and the like, metal pigments comprising metal powders of aluminum, brass and the like, pearl pigments comprising flake powders of titanium dioxide-covered mica, basic lead carbonate and the like, fluorescent pigments and the like. They can be used alone or in a mixture of two or more kinds thereof.

The above print layer 12 is one of representative layers which are formed as layers for providing the decorated sheet with decorative patterns, and a metal thin film layer and the like may be formed thereon in order to enhance more a decorativeness of the above print layer 12. The metal thin film layer can be formed by a method such as vacuum vapor deposition, sputtering and the like using metal such as aluminum, chromium, gold, silver, copper and the like. The above metal thin film layer may be provided on the whole surface or partially in a pattern form.

(3) Surface Resin Layer

Next, the surface resin layer 13 in the decorated sheet 10 of the present invention shall be explained.

The surface resin layer 13 in the present invention is a layer which is positioned on the surface of the decorated sheet 10 and which is formed for the purposes of protecting the print layer 12 described above and providing the decorated sheet 10 with various effects according to uses.

In the present application, the materials thereof shall not specifically be restricted, and various resins can be used. To be specific, they include, for example, resins such as acryls, polyesters, polypropylene, ethylene-vinyl alcohol copolymers, polycarbonate, cellulose triacetate and the like. Among them, acryl resins are preferably used considering the insert moldability, the weatherability and the surface hardness.

In this respect, the acryl resins include acryl resins comprising homopolymers or copolymers containing (meth)acrylic esters such as polymethyl (meth)acrylate, polyethyl (meth)acrylate, polypropyl (meth)acrylate, polybutyl (meth)acrylate, methyl (meth)acrylate•butyl (meth)acrylate copolymers, ethyl (meth)acrylate•butyl (meth)acrylate copolymers, ethylene•methyl (meth)acrylate copolymers, styrene•methyl (meth)acrylate copolymers and the like (provided that methyl (meth)acrylate means methyl acrylate or methyl methacrylate, and hereinafter (meth) shall have the same meaning). In the case of polymethyl (meth)acrylate, the polymerization degree is preferably about 900 to 1800, and if the polymerization degree is larger than the above range, a low molecular material having an action to provide the plasticity has to be added to lower the thermal deformation temperature.

On the other hand, the polyester resins described above include polyester resins represented by polyethylene terephthalate, polybutylene terephthalate, ethylene•terephthalate•isophthalate copolymers and the like. The polyester resin is a copolymer obtained by ester-bonding both of an acid component such as aromatic dicarboxylic acid including terephthalic acid, isophthalic acid, naphthalenedicarboxylic acid and the like and an alcohol component such as aliphatic diol including ethylene glycol, diethylene glycol, butanediol, hexanediol and the like.

In the surface resin layer 13 of the present invention, a UV absorber and/or a light stabilizer can be added for the purpose of providing the decorated sheet 10 with a weatherability (light fastness). In this case, an addition amount thereof is usually about 0.5 to 10% by weight in both cases of the UV absorber and the light stabilizer, and in general, the UV absorber and the light stabilizer are preferably used in combination. Capable of being used as the UV absorber are organic compounds such as benzotriazole, benzophenone, salicylic esters, triazine and the like and inorganic compounds such as zinc oxide, cerium oxide, titanium oxide and the like each having a fine particle form of 0.2 µm or less. Hindered amine base radical scavengers such as bis-(2,2,6,6-tetramethyl-4-piperidinyl) sebacate and the like and piperidine base radical scavengers can be used as the stabilizer.

Further, in addition to the UV absorber and the light stabilizer described above, powders of calcium carbonate, barium sulfate, clay, talc and the like may be added as a filler. An addition amount thereof is suitably determined according to the uses. Also, powders of aluminum hydroxide, magnesium hydroxide and the like are added as a flame retardant in a certain case to a colored thermoplastic resin layer. An addition amount thereof falls preferably in a range of 10 to 150 parts by weight based on 100 parts by weight of the thermoplastic resin.

A thickness of the above surface resin layer 13 has to fall in a range of 50 to 150 µm. If the thickness is less than 50 µm, it is difficult to display the effects of the above layer, and if it is larger than 150 µm, heat transferred from the injected resin in insert molding is filled in the decorated sheet in the metal die to cause ink flow in a certain case. From the viewpoints described above, a thickness of the above surface resin layer 13 is more preferably 75 to 125 µm.

(4) Other Layers and Various Treatments

As described above, the decorated sheet 10 of the present invention is composed, as described above, of at least the base sheet 11, the print layer 12 and the surface resin layer 13. However, layers constituting the decorated sheet 10 are not restricted to the above layers, and other layers can suitably be laminated as well according to the uses of the decorated sheet and the performances required.

Further, a readily adhesive primer layer (not illustrated) may be formed on a back surface side (a side reverse to a face on which the print layer is formed) of the base sheet 11 for the purpose of enhancing an adhesive property of the decorated sheet 10 with an adherend.

Curable resins and thermoplastic resins such as various urethane resins, epoxy resins, thermoplastic polyester resins, polyamide resins and the like can be used for the readily adhesive primer layer. Among them, two-component curable urethane resins are preferred since a good adhesive property can be achieved to a broad range of adherend materials.

A back surface side of the base sheet 11 may be subjected to readily adhesive treatment in place of forming the readily adhesive primer layer described above or in addition to the formation of the readily adhesive primer layer. The readily adhesive treatment includes, for example, corona discharge treatment, ozone treatment and the like.

Further, in the decorated sheet 10 of the present invention, irregular patterns may be formed as decorating treatment on a part or the whole part of various layers constituting the decorated sheet 10. A design property of the whole part of the decorated sheet 10 can be further enhanced by forming the above irregular patterns.

The above irregular patterns can be formed by hair line processing, sand blast processing, emboss processing and the like. For example, in the emboss processing, the irregular patterns are formed by pressing an emboss plate onto the surface of a resin sheet which is heated and softened by means of a single layer or rotary type emboss machine of a hot press system. In this case, the resin sheet is the surface resin layer or the base sheet. The irregular patterns may be formed at the same time as forming the base sheet and the surface resin layer. For example, the irregular patterns are formed at the same time as forming a layer by T die melt extrusion method using as a cooling roller, an embossing and cooling roller having irregular patterns on a cooling face. Further, the irregular patterns can be formed as well by a so-called doubling emboss method in which at the same time as laminating the base sheet and the surface resin layer, the irregular patterns are formed on a surface side of the surface resin layer by emboss processing by hot pressing. The irregular patterns include woodgrain plate conduit grooves, slate palette surface irregularities (granite cleavage plane and the like), cloth surface texture, pearskin finish, sand grains, hair lines, line grooves and the like. The irregular patterns are provided usually on a surface side of the surface resin layer, and they are provided as well on a back side of the surface resin layer, a surface side of the base sheet and a back side of the base sheet in a certain case.

Further, a colored part can be formed by filling an inside of a concave part in the irregular patterns with a color ink by a publicly known wiping method (refer to Japanese Patent Publication No. 14312/1983 and the like). The same materials as used for the print layer 12 described above can be used for the color ink. An ink comprising a two-component curable urethane resin as a binder is preferred in terms of the abrasion resistance. The wiping method may be carried out by any of wiping methods such as a doctor blade method, a roll coating method and the like which have so far been used. That is, the color ink is coated on the whole surface of the irregular patterns, and then the ink present on the convex part is scraped away or wiped off with a doctor blade, a sponge roll, a cloth or the like so that the color ink remains in the concave part.

(5) Adherend for the Decorated Sheet

Adherends (that is, the use of the decorated sheet of the present invention) for which the decorated sheet of the present invention is used shall not specifically be restricted, and it can be used for various articles formed by the insert molding method. Resin materials used for the insert molding method include resin materials used in the forms of plates, sterically formed articles, sheets and the like of acryl resins, polyester resins, polystyrene resins, polyolefin resins such as polypropylene and the like, ABS (acrylonitrile-butadiene-styrene copolymer) resins, phenol resins, vinyl chloride resins, cellulose base resins, rubber and the like, materials obtained by combining two or more kinds of the above materials, for example, composite (raw) materials such as wood powder plastics, paper powder plastics, FRP (fiber-reinforced plastics) and the like which are used in the forms of plates, sterically formed articles and the like.

(6) Adhering (Laminating) Method onto the Adherend

The decorated sheet of the present invention has been developed for the purpose that it is used principally for an insert molding method, and therefore a method of adhering (laminating) the decorated sheet onto the adherend is preferably a method in which the decorated sheet is adhered integrally on the surface of an insert molded article in insert molding. To be specific, it includes an insert molding method in which the decorated sheet is disposed, as described in Japanese Patent Publication No. 19132/1975 and Japanese Patent Publication No. 27488/1968), between both male and female metal dies for injection molding and in which a molten resin is injected and filled into the dies to mold an adherend which is a resin molded article and adhere and laminate the decorated sheet on the surface thereof at the same time.

EXAMPLES

Example 1

An ABS resin having an acryl content of 28% by weight, a butadiene content of 30% by weight and a styrene content of 42% by weight each based on the whole amount and having a thickness of 400 μm was used as a base sheet, and an adhesive comprising a polyester•urethane resin as a principal component was coated thereon in a thickness of 8 μm. On the other hand, a print layer having a thickness of 5 μm was formed on a back face side of an acryl resin having a thickness of 75 μm as a surface resin layer by using a print ink comprising a polyester•urethane resin as a binder component, and then the surface resin layer on which the above print layer was formed was laminated on the adhesive described above, whereby a decorated sheet of Example 1 according to the present invention was prepared.

Example 2

A decorated sheet of Example 2 according to the present invention was prepared on the same conditions as in Example 1 described above, except that the composition of the ABS resin as the base sheet was changed to an acryl content of 34% by weight, a butadiene content of 24% by weight and a styrene content of 42% by weight each based on the whole amount.

Example 3

A decorated sheet of Example 3 according to the present invention was prepared on the same conditions as in Example 1, except that the composition of the ABS resin as the base sheet was changed to an acryl content of 45% by weight, a butadiene content of 15% by weight and a styrene content of 40% by weight each based on the whole amount.

Example 4

The decorated sheet of Example 4 according to the present invention was prepared on the same conditions as in Example 1, except that the composition of the ABS resin as the base sheet was changed to an acryl content of 42% by weight, a butadiene content of 12% by weight and a styrene content of 46% by weight each based on the whole amount.

Example 5

A decorated sheet of Example 5 according to the present invention was prepared in the same manner as in Example 4, except that an acryl resin having a thickness of 50 μm was used in place of the acryl resin having a thickness of 75 μm used as the surface resin layer in Example 4.

Example 6

A decorated sheet of Example 6 according to the present invention was prepared in the same manner as in Example 1, except that an acryl resin having a thickness of 125 μm was used in place of the acryl resin having a thickness of 75 μm used as the surface resin layer in Example 1.

Example 7

A decorated sheet of Example 7 according to the present invention was prepared on the same conditions as in Example 1, except that the composition of the ABS resin as the base sheet was changed to an acryl content of 28% by weight, a butadiene content of 27% by weight and a styrene content of 45% by weight each based on the whole amount.

Example 8

A decorated sheet of Example 8 according to the present invention was prepared on the same conditions as in Example 1, except that the composition of the ABS resin as the base sheet was changed to an acryl content of 28% by weight, a butadiene content of 33% by weight and a styrene content of 39% by weight each based on the whole amount.

Example 9

A decorated sheet of Example 9 according to the present invention was prepared in the same manner as in Example 7, except that an acryl resin having a thickness of 125 μm was used in place of the acryl resin having a thickness of 75 μm used as the surface resin layer in Example 7.

Comparative Example 1

A decorated sheet of Comparative Example 1 was prepared on the same conditions as in Example 1 described above, except that the composition of the ABS resin as the base sheet was changed to an acryl content of 15% by weight, a butadiene content of 40% by weight and a styrene content of 45% by weight each based on the whole amount.

Comparative Example 2

A decorated sheet of Comparative Example 2 was prepared on the same conditions as in Example 1, except that the composition of the ABS resin as the base sheet was changed to an acryl content of 48% by weight, a butadiene content of 4% by weight and a styrene content of 48% by weight each based on the whole amount.

Comparison Tests:

1. Bend Elastic Modulus

In Examples 1 to 9 and Comparative Examples 1 to 2 described above, the bend elastic modulus of the ABS resins each used as the base sheet were measured by a test method prescribed in ISO 178. The results thereof are shown in the following Table 1.

2. Vicat Softening Temperature

In Examples 1 to 9 and Comparative Examples 1 to 2, the Vicat softening temperatures of the ABS resins each used as the base sheet were measured by a test method prescribed in JIS K 7206. The results thereof are shown in the following Table 1.

3. Laminate Aptitude

A laminate aptitude test was carried out in order to judge the adhesive properties of the respective layers constituting the decorated sheets prepared in Examples 1 to 9 and Comparative Examples 1 to 2. This test was evaluated by dry laminate. The conditions of the dry laminate were set to a laminate pressure of 4.5 MPa, a tension of 40 kgf, a penetrate-into-ABS angle of 50 degrees and a penetrate-into-ABS temperature of 80° C. The results thereof are shown in the following Table 1.

4. Odor

In Examples 1 to 9 and Comparative Examples 1 to 2, an odor test of the ABS resins used for the respective base sheets was carried out in order to judge the rubber odor thereof. The above test was carried out by putting each ABS resin (30 mm×10 mm) into a bottle having a height of 100 mm, a diameter of 50 mm and a mouth diameter of 30 mm, leaving the bottle standing at 60° C. for 2 hours after covering it with a cap and then sniffing it in order by six persons. The cap of the bottle was opened, and the first person sniffed it at a distance of 5 cm from the mouth of the bottle. The cap was closed within 5 seconds, and the bottle was heated in an oven for 15 minutes. Then, the second person sniffed the bottle in the same manner, and this was repeated up to the sixth person.

The evaluation was carried out according to the following six levels and judged by an average score of total points given by four persons excluding each one person who gave the highest point or the lowest point. The results thereof are shown in the following Table 1. In the actual use, the level of lower than Evaluation 3 is expected to pass the test.

Evaluation 1: no odor
Evaluation 2: odor is felt but is not unpleasant
Evaluation 3: unpleasant odor
Evaluation 4: very unpleasant odor
Evaluation 5: venomous odor
Evaluation 6: Intolerable Odor 5. Insert Moldability The decorated sheets prepared in Examples 1 to 9 and Comparative Examples 1 to 2 were used to actually carry out insert molding, and it was comprehensively evaluated. The results thereof are shown in the following Table 1.

6. Surface Hardness

The decorated sheets prepared in Examples 1 to 9 and Comparative Examples 1 to 2 were measured for a surface hardness by a pencil hardness method prescribed in JIS. The results thereof are shown in the following Table 1.

TABLE 1

|  | Acryl content (% by weight) | Butadiene content (% by weight) | Styrene content (% by weight) | Bend elastic modulus (MPa) | Vicat softening temperature (° C.) | Laminate aptitude | Odor | Insert moldability | Surface hardness |
|---|---|---|---|---|---|---|---|---|---|
| Example 1 | 28 | 30 | 42 | 1230 | 92 | Good | 2.5 | Good | F |
| Example 2 | 34 | 24 | 42 | 1300 | 95 | Good | 2.3 | Good | F |
| Example 3 | 45 | 15 | 40 | 1600 | 98 | Good | 1.5 | Good | H |
| Example 4 | 42 | 12 | 46 | 1800 | 100 | Good | 1.5 | Good | H |
| Example 5 | 42 | 12 | 46 | 1800 | 100 | Good | 1.5 | Good | B |
| Example 6 | 28 | 30 | 42 | 1230 | 92 | Good | 2.5 | Good | H |
| Example 7 | 28 | 27 | 45 | 1260 | 94 | Good | 2.5 | Good | F |
| Example 8 | 28 | 33 | 39 | 1100 | 88 | Good | 3.0 | Good | F |
| Example 9 | 28 | 27 | 45 | 1260 | 94 | Good | 2.5 | Good | H |
| Comparative Example 1 | 15 | 40 | 45 | 900 | 82 | Good | 4.1 | Good | 2B |
| Comparative Example 2 | 48 | 4 | 48 | 2300 | 103 | X*[1] | 1.5 | Good | H |

*[1]air filling and slack were caused

As apparent from the results shown in above Table 1, it has been found that the decorated sheets of the present invention are excellent in a rubber odor, an insert moldability and the like as compared with the decorated sheets of the comparative examples.

INDUSTRIAL APPLICABILITY

According to the decorated sheet for insert molding of the present invention, the decorated sheet can be provided with various characteristics such as a rigidity, a hardness, a processability, an impact resistance, a bend fatigue property and the like with which an ABS resin is endowed. Also, the decorated sheet for insert molding of the present invention can be improved in a moldability without generating a characteristic rubber odor originating in a butadiene component in bringing the decorated sheet into contact with a resin molten at 200° C. or higher in insert molding. Further, the ink constituting the print layer does not flow due to heat, and therefore the design property can be maintained. From the viewpoints described above, the decorated sheet for insert molding of the present invention can be used for various applications, and it can suitably be used particularly for decoration of interior panels of cars and the like.

What is claimed is:

1. A decorated sheet having a property that it is capable of being used in an insert molding method, and in which at least a base sheet, a print layer and a surface resin layer are laminated, wherein said base sheet comprises an ABS resin having an acrylonitrile content of 28-34% by weight, a butadiene content of 24 to 33% by weight, and a styrene content of 38 to 48% by weight, based on the total weight of the ABS resin, with the sum of the contents of the acrylonitrile, the butadiene and the styrene, in the ABS resin, totaling 100% by weight, wherein the surface resin layer has a thickness of 50 to 125 µm, and wherein the base sheet has a thickness such that the decorated sheet is capable of being used in the insert molding method and wherein the surface resin layer is made of an acrylic resin.

2. The decorated sheet as described in claim 1, wherein the base sheet has a Vicat softening temperature of 85 to 100° C. and a bend elastic modulus of 1100 to 2000 MPa.

3. The decorated sheet for as described in claim 1, wherein at least a thermoplastic resin is contained in the print layer.

4. The decorated sheet as described in claim 2, wherein at least a thermoplastic resin is contained in the print layer.

5. The decorated sheet as described in claim 1, wherein the ABS resin has a butadiene content of 27 to 30% by weight.

6. The decorated sheet as described in claim 1, wherein the base sheet has a thickness in the range of 300 to 700 µm.

7. The decorated sheet as described in claim 1, wherein the base sheet has a thickness in the range of 400 to 600 µm.

8. The decorated sheet as described in claim 1, wherein the thickness of the decorated sheet is 2.5 to 3.0 mm.

9. The decorated sheet as described in claim 3, wherein said thermoplastic resin contained in the print layer is a polyester-urethane resin.

10. The decorated sheet as described in claim 1, wherein the thickness of the surface resin layer is in the range of 75 to 125 µm.

11. A production process for an insert decorated molding, comprising:
    positioning the decorated sheet according to claim 1 between male and female dies for injection molding, and injecting and filling a molten resin into the space between the dies.

12. The production process according to claim 11, wherein in injecting and filling the molten resin into the space between the dies, a molded article of the resin is formed simultaneously with adhering and laminating the decorated sheet on the surface of the resin.

13. The production process according to claim 11, wherein said base sheet of the decorated sheet has a Vicat softening temperature of 85 to 100° C. and a bend elastic modulus of 1100 to 2000 MPa.

14. The production process according to claim 11, wherein the decorated sheet is positioned between the male and female dies such that in injecting and filling the molten resin into the space between the dies, the molten resin is injected to the side of the base sheet opposite to the side thereof on which the print layer is positioned.

15. The decorated sheet as described in claim 4, wherein the thermoplastic resin contained in the print layer is a polyester-urethane resin.

* * * * *